(No Model.)
E. O. BARTLETT.
APPARATUS FOR THE MANUFACTURE OF PIGMENT FROM METALLIC FUMES.
No. 515,040. Patented Feb. 20, 1894.
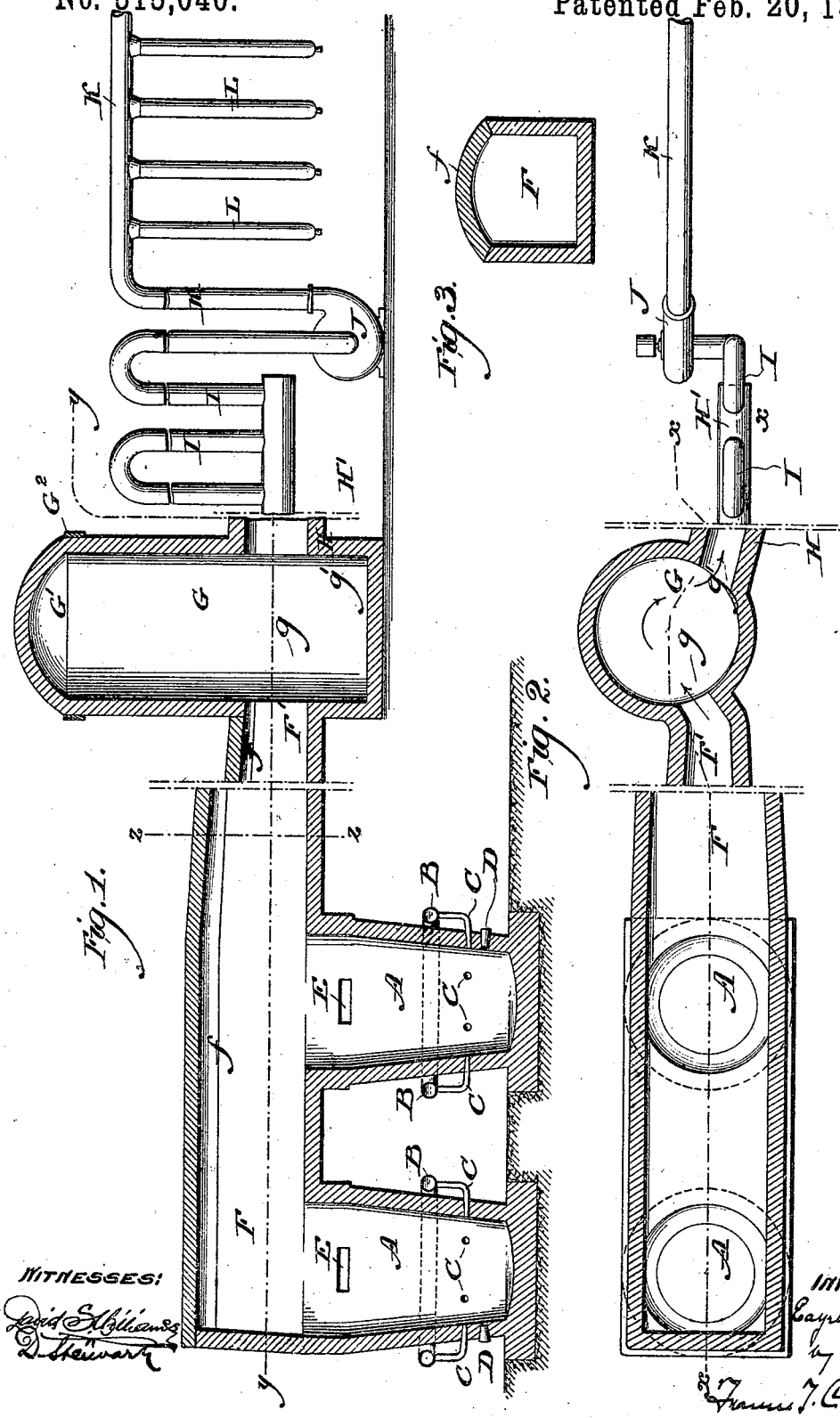
WITNESSES:
INVENTOR:

UNITED STATES PATENT OFFICE.

EAYRE O. BARTLETT, OF JOPLIN, MISSOURI.

APPARATUS FOR THE MANUFACTURE OF PIGMENT FROM METALLIC FUMES.

SPECIFICATION forming part of Letters Patent No. 515,040, dated February 20, 1894.

Application filed April 6, 1893. Serial No. 469,254. (No model.)

*To all whom it may concern:*

Be it known that I, EAYRE O. BARTLETT, a citizen of the United States, residing at Joplin, in the county of Jasper and State of Missouri, have invented an Improved Apparatus for Manufacturing Pigment from Metallic Fumes, of which the following is a true and exact description, reference being had to the accompanying drawings, which form a part of this specification.

My invention relates to apparatus for manufacturing pigment from metallic fumes, such as the fume driven off in suitable furnaces from lead or lead ore.

The object of my invention is to generally improve the character and operation of the apparatus usually employed for this purpose and the nature of my improvements will be best understood as described in connection with the drawings in which they are illustrated, and in which—

Figure 1 is a side elevation partly in section on the line $x$—$x$ of Fig. 2, showing a pigment furnace constructed with my improvements. Fig. 2 is a plan view of the same partly in section on the line $y$—$y$ of Fig. 1, and Fig. 3 is a cross-section of the refining flue on the line $z$—$z$ of Fig. 1.

A A indicate the furnaces in which the ores, cinders, &c., are treated for the purpose of driving off the metallic fume. There may be one or any desired number of such furnaces connected with a single refining flue such as is indicated at F F'; the construction of the furnace involves no novel feature, B, indicating the main blast pipes from which lead the tuyeres C, D indicating a tap hole from which metallic lead and slag is drawn at suitable intervals and E, the feed opening. The refining flue F is constructed with its walls or a greater part of them made up of refractory material such as fire-brick and of sufficient thickness to insure storage and regenerative action of the heat communicated from the furnace gases passing through the flue. The part of the flue over and near the furnaces is preferably constructed of about eight feet (8') height and four or five feet (4 or 5') width internal measure. After passing from above the furnaces I prefer to make the flue of a gradually tapering section so that at its delivery end which may be at say fifty feet from the furnace it shall be about six (6) feet in height by three (3) feet in width; preferably also I construct the top of the flue of an arched form as indicated at $f$; though this is not essential, I have found that the gradual tapering of the flue has an important function in increasing the temperature of the gases or maintaining them at the necessary high temperature to promote the purification of the fume; this tapering is further advisable in increasing the speed with which the gases issue from the refining flue into the refining tower indicated at G and the combination of which with the preferably tapered flue and the cooling and screening apparatus forms the essential feature of my invention. This tower is placed as shown, at the delivery end of the refining flue F, that is to say, at the narrowed end F' of said flue and for use with two furnaces and flue of substantially the dimensions given should be about eighteen feet in height by twelve feet in diameter and with a wall of refractory material such as fire-brick, sufficiently thick to prevent the escape of heat therethrough. Preferably I provide it with an arched roof as indicated at G' so as to reverberate heat down into gases and fume filling the tower; preferably also, I arrange the tower G and flue F or the end F' of said flue so that as shown, the gases issuing from the flue will enter the tower in an oblique direction, causing them to have a whirling or turning effect in the tower which I have found to be of decided advantage. An opening $g'$ leads from the tower into a flue H which in turn leads to a system of cooling flues and screens such as fabric bags.

In the drawings I have simply indicated the cooling and screening system in a conventional way; the cooling system being described as made up of flue H with U shaped pipes I connected with it and leading to a fan-blower J which forces the cool gases and fume through a conduit K to a system of bag screens indicated at L.

I have found that in the use of the horizontal refining flue alone even when made of tapered section as indicated, the refining action of the heat upon the fume is not as perfect as could be desired, and particularly when the apparatus works in a defective manner after temporary interruptions in the process such as occur either from accident or owing to the necessity of cleaning out parts of the flue system, which occur as often as two or three times a day; by supplementing the refining flue with a vertical tower I find that I obtain a much better combustion and purification during ordinary running of the system and also without the trouble due to the imperfect working of the flue after temporary interruptions is entirely overcome, the result of the combined action of the flue and tower is strikingly beneficial as producing uniformity in the color of the pigment.

Having now described my invention, what I claim as new, and desire to secure by Letters Patent, is—

1. The combination with one or more pigment producing furnaces, of a horizontal flue having walls of refractory material a vertical tower of greater cross-section than the flue, and into which said flue opens, said tower also being provided with walls of refractory material, the tower and flue being adapted to maintain the fume and gases passing through them at a very high temperature to insure the purification of the fume, a screening system, and a cooling flue connecting the tower with the screening system.

2. The combination with one or more pigment producing furnaces, of a horizontal flue having walls of refractory material, a vertical tower also having walls of refractory material, into the lower part of which tower the flue opens, the flue and tower being adapted to maintain the fume and gases passing through them at a very high temperature to insure the purification of the fume an opening $g'$ in said tower at substantially the same level as the flue opening, a screening system and a cooling flue leading from the opening $g'$ to the screening system.

3. The combination with one or more pigment producing furnaces, of a horizontal flue having walls of refractory material, a vertical tower also having walls and a dome shaped roof of refractory material and into which the flue opens, the flue and tower being adapted to retain the gases and fume passing through them at a very high temperature to insure the purification of the fume, and a cooling and screening system also connected with said tower.

4. The combination of one or more pigment producing furnaces with a horizontal flue gradually converging, having walls of refractory material, a vertical tower having also walls of refractory material at the end of said flue and a cooling and screening system also connected with said tower.

5. The combination of one or more pigment producing furnaces with a horizontal flue having walls of refractory material and an arched roof, a vertical tower having also walls of refractory material at the end of said flue and a cooling and screening system also connected with said tower.

6. The combination of one or more pigment producing furnaces with a horizontal flue gradually converging, having walls of refractory material and an arched roof, a vertical tower having also walls of refractory material at the end of said flue and a cooling and screening system also connected with said tower.

7. The combination of one or more pigment producing furnaces with a horizontal flue having walls of refractory material, a vertical rounded tower having also walls of refractory material situated at the end of said flue and so placed that the gases therefrom will enter the tower obliquely and receive a circular motion therein and a cooling and screening system also connected with said tower.

EAYRE O. BARTLETT.

Witnesses:
WALTER W. ALLEN,
FRANCIS T. CHAMBERS.